United States Patent
Yamagiwa et al.

(10) Patent No.: US 7,303,701 B2
(45) Date of Patent: Dec. 4, 2007

(54) METHOD FOR ESTIMATING TEMPERATURES OF PLASTICIZED RESIN WITHIN HEATING CYLINDER AND AT NOZZLE OUTLET, AND ESTIMATING INJECTING CONDITIONS

(75) Inventors: Yoshitoshi Yamagiwa, Hanishina-Gun (JP); Takayoshi Shiori, Hanishina-Gun (JP); Takashi Terashima, Hanishina-Gun (JP); Eiki Iwashita, Hanishina-Gun (JP)

(73) Assignee: Nissei Plastic Industrial Co., Ltd., Nagano (JP)

( * ) Notice: Subject to any disclaimer, the term of this patent is extended or adjusted under 35 U.S.C. 154(b) by 560 days.

(21) Appl. No.: 10/703,917

(22) Filed: Nov. 6, 2003

(65) Prior Publication Data
US 2004/0089964 A1   May 13, 2004

(30) Foreign Application Priority Data
Nov. 7, 2002   (JP) ............................... 2002-324432

(51) Int. Cl.
B29C 45/78 (2006.01)

(52) U.S. Cl. ................... 264/40.1; 264/40.5; 264/40.6; 264/40.7

(58) Field of Classification Search .............. 264/40.1
See application file for complete search history.

(56) References Cited

U.S. PATENT DOCUMENTS
5,397,515 A * 3/1995 Searle et al. ............... 264/40.6

FOREIGN PATENT DOCUMENTS
JP     06246786 A     9/1994

* cited by examiner

Primary Examiner—Monica A Huson
(74) Attorney, Agent, or Firm—Hamre, Schumann, Mueller & Larson, P.C.

(57) ABSTRACT

A provisional temperature estimating mathematical expression is set in accordance with which plasticizing conditions used as terms are to be multiplied by unknown coefficients. Then, a given number of experiments not smaller than the number of the unknown coefficients are conducted while the plasticizing conditions are varied, so as to acquire various experimental data. The unknown coefficients are converted into known coefficient in accordance with the acquired experimental data so as to provide a complete temperature estimating mathematical expression, on the basis of which a plasticized resin temperature and noise-outlet resin temperature are determined arithmetically.

6 Claims, 9 Drawing Sheets

METHOD FOR ESTIMATING TEMPERATURES OF PLASTICIZED RESIN WITHIN HEATING CYLINDER AND AT NOZZLE OUTLET, AND ESTIMATING INJECTING CONDITIONS

FIELD OF THE INVENTION

The present invention relates to techniques for arithmetically estimating temperatures of plasticized resin within a heating cylinder and at the outlet of a nozzle in an injection machine or mechanism.

BACKGROUND OF THE INVENTION

Techniques for measuring a temperature of plasticized resin in an injection mechanism by use of a thermocouple have been known from, for example, Japanese Patent Laid-Open Publication No. HEI-6-246786.

Figure 9:
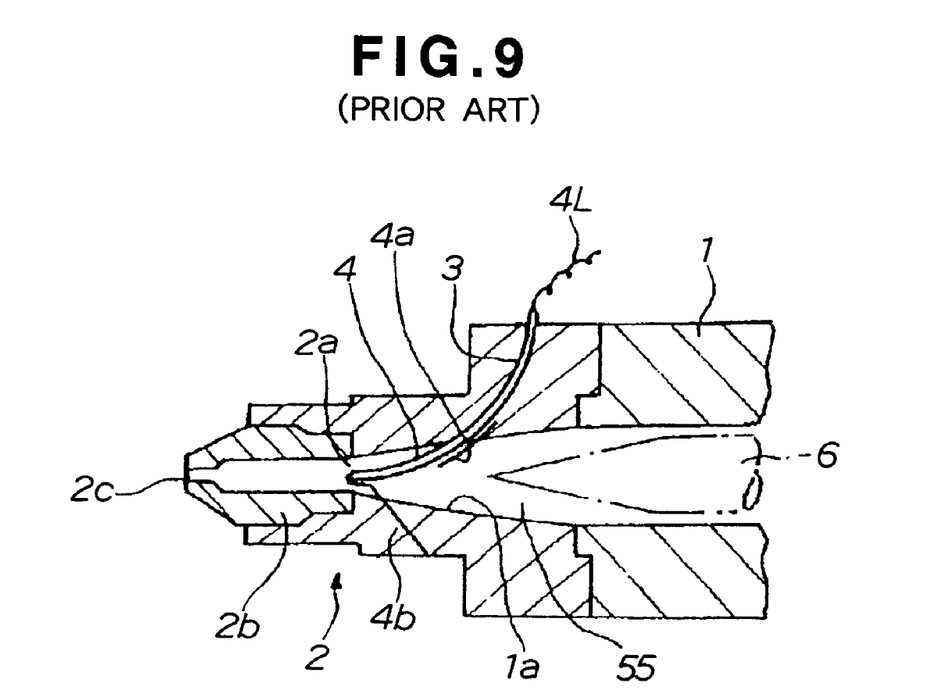
FIG. 9 is a sectional view explanatory of a conventional plasticized resin temperature measuring technique.

FIG. 9 hereof is a sectional view explanatory of the plasticized resin temperature measuring technique disclosed in the HEI-6-246786 publication, wherein reference numeral 1 represents a heating cylinder, 2 a nozzle, 4 a thermocouple and 4b a piano wire. The disclosed technique is intended to measure a temperature of resin 5, and particularly plasticized resin, using the thermocouple 4. The thermocouple 4, exposed to a flow of resin, tends to be undesirably displaced from a predetermined position, and thus the piano wire 4b or other suitable thermocouple retaining member is essential to prevent the displacement of the thermocouple 4. Further, the nozzle 2 must be indispensably accompanied by the thermocouple 4, which would add to manufacturing costs. Namely, with the disclosed conventional technique, the provision of the thermocouple 4 in the nozzle 2 not only increases the necessary manufacturing costs but also complicates the overall structure of the nozzle 2. Because of the complicated structure of the nozzle 2, the nozzle 2 etc. have to be handled with due care, which would result in lowered productivity.

SUMMARY OF THE INVENTION

In view of the foregoing prior art problems, it is an object of the present invention to provide a method and apparatus for arithmetically estimating temperatures of plasticized resin within a heating cylinder and at the outlet of a nozzle in an injection mechanism.

In order to accomplish the above-mentioned object, the present invention provides a method for estimating a temperature of plasticized resin within a heating cylinder, which comprises: a step of selecting one or more of a heating cylinder temperature, cycle time, metered resin amount (i.e., amount of resin temporarily accumulated by a screw in a predetermined metering zone while being measured so that a predetermined amount of the resin can be fed to an injection mold), back pressure and number of rotations of the screw to be set as plasticizing conditions, and setting a provisional plasticized-resin temperature estimating mathematical expression indicating that the selected plasticizing conditions are to be multiplied by respective unknown coefficients and the multiplication results are to be summed up; a step of conducting a given number of experiments equal to or greater than the number of the unknown coefficients in the provisional plasticized-resin temperature estimating mathematical expression, to thereby acquire data indicative of the one or more of the heating cylinder temperature, cycle time, metered resin amount, back pressure and number of rotations of the screw; a step of converting the unknown coefficients into known coefficients in accordance with the data acquired from the experiments; a step of converting the provisional plasticizedresin temperature estimating mathematical expression into a complete plasticized-resin temperature estimating mathematical expression using the known coefficients; and a step of estimating a current temperature of the plasticized resin within the heating cylinder by substituting plasticizing conditions into the complete plasticized-resin temperature estimating mathematical expression.

Note that, throughout this specification, the terms "meter", "metering", "metered" etc. are used in the context of measurement and temporary accumulation, in the predetermined metering zone, of the "to-be-injected resin". In normal operations after experiments or trial operations, the inventive method thus arranged can arithmetically estimate the current temperature of the plasticized resin in the heating cylinder, using the mathematical expressions, without actual measuring operations. As a consequence, the nozzle need not be provided with any physical temperature measuring means, such as a temperature sensor, and thus a simplified construction of the nozzle can be achieved. Further, whereas the conventionally-known technique estimates such a plasticized resin temperature on the basis of a detected temperature of the heating cylinder and can therefore only achieve poor measurement accuracy, the inventive method can estimate, with a much higher accuracy, plasticized resin temperature closely approximate to an actual measurement.

The present invention also provides a method for estimating a temperature of plasticized resin within a heating cylinder, which comprises: a step of selecting one or more of a heating cylinder temperature, cycle time, metered resin amount, back pressure and number of rotations of a screw to be set as plasticizing conditions, selecting both or either one of monitored values of a resin metering time and resin metering torque, and setting an provisional plasticized-resin temperature estimating mathematical expression indicating that the selected plasticizing conditions and monitored value are to be multiplied by respective unknown coefficients and the multiplication results are to be summed up; a step of conducting a given number of experiments equal to or greater than the number of the unknown coefficients in the provisional plasticized-resin temperature estimating mathematical expression, to thereby acquire data indicative of the one or more of the heating cylinder temperature, cycle time, metered resin amount, back pressure and number of rotations of a screw and both or either one of the monitored values of the resin metering time and resin metering torque; a step of converting the unknown coefficients into known coefficients in accordance with the data acquired from the experiments; a step of converting the provisional plasticized-resin temperature estimating mathematical expression into a complete plasticized-resin temperature estimating mathematical expression using the known coefficients; and a step of estimating a current temperature of the plasticized resin by substituting plasticizing conditions and monitored value into the complete plasticized-resin temperature estimating mathematical expression.

Namely, the invention is characterized by considering both or either one of the monitored values of the resin metering time and resin metering torque in addition to the plasticizing conditions. With such an arrangement, the inventive method can estimate the plasticized resin temperature of even higher accuracy which is closely approximate to an actual measurement.

The present invention also provides a method for estimating a temperature of resin at an outlet of a nozzle, which comprises: a step of selecting one or more of a filling speed, holding pressure and nozzle temperature to be set as injecting conditions, selecting a temperature of plasticized resin within a heating cylinder estimated by the method as set forth above, and setting a provisional nozzle-outlet resin temperature estimating mathematical expression indicating that the selected injecting conditions and temperature of the plasticized resin are to be multiplied by respective unknown coefficients and the multiplication results are to be summed up; a step of conducting a given number of experiments equal to or greater than the number of the unknown coefficients in the provisional nozzle-outlet resin temperature estimating mathematical expression, to thereby acquire data indicative of the temperature of the plasticized resin within a distal end of the heating cylinder and one or more of the filling speed, holding pressure and nozzle temperature; a step of converting the unknown coefficients into known coefficients in accordance with the data acquired from the experiments; a step of converting the provisional nozzle-outlet resin temperature estimating mathematical expression into a complete nozzle-outlet resin temperature estimating mathematical expression using the known coefficients; and a step of estimating a current temperature of the resin at the outlet of the nozzle by substituting injecting conditions into the complete nozzle-outlet resin temperature estimating mathematical expression.

In normal operations after experiments or trial operations, the inventive method thus arranged can arithmetically estimate a nozzle-outlet resin temperature, using the mathematical expressions, without actual measuring operations. As a consequence, the nozzle need not be provided with any physical temperature measuring means, and thus a simplified construction of the nozzle can be achieved. Further, whereas the conventionally-known technique estimates such a nozzle-outlet resin temperature using a temperature of the heating cylinder and thus can only achieve poor measurement accuracy, the inventive method can estimate a highly-accurate nozzle-outlet resin temperature closely approximate to an actual measurement.

The present invention also provides method for estimating an injecting condition, which comprises: a step of selecting one or more of a filling speed, holding pressure and nozzle temperature to be set as injecting conditions, selecting a temperature of plasticized resin within a heating cylinder estimated by the method described above and setting a provisional nozzle-outlet resin temperature estimating mathematical expression indicating that the selected injecting conditions and temperature of the plasticized resin are to be multiplied by respective unknown coefficients and the multiplication results are to be summed up; a step of conducting a given number of experiments equal to or greater than the number of the unknown coefficients in the provisional nozzle-outlet resin temperature estimating mathematical expression, to thereby acquire data indicative of the temperature of the plasticized resin within a distal end of the heating cylinder and one or more of the filling speed, holding pressure and nozzle temperature; a step of converting the unknown coefficients into known coefficients in accordance with the data acquired from the experiments; a step of converting the provisional nozzle-outlet resin temperature estimating mathematical expression into a complete nozzle-outlet resin temperature estimating mathematical expression using the known coefficients; and a step of estimating a given one of the injecting conditions by substituting, into the complete nozzle-outlet resin temperature estimating mathematical expression, each of the injecting conditions other than the given plasticizing condition, and a desired nozzle-outlet resin temperature value.

The inventive method thus arranged can achieve high-accuracy estimation of any one of the filling speed, holding pressure and nozzle temperature, so that it can set injecting conditions of much higher accuracy than those set by the conventionally-known technique.

The present invention may be constructed and implemented not only as the method invention as discussed above but also as an apparatus invention and computer program, as will be apparent from the following description.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 2:
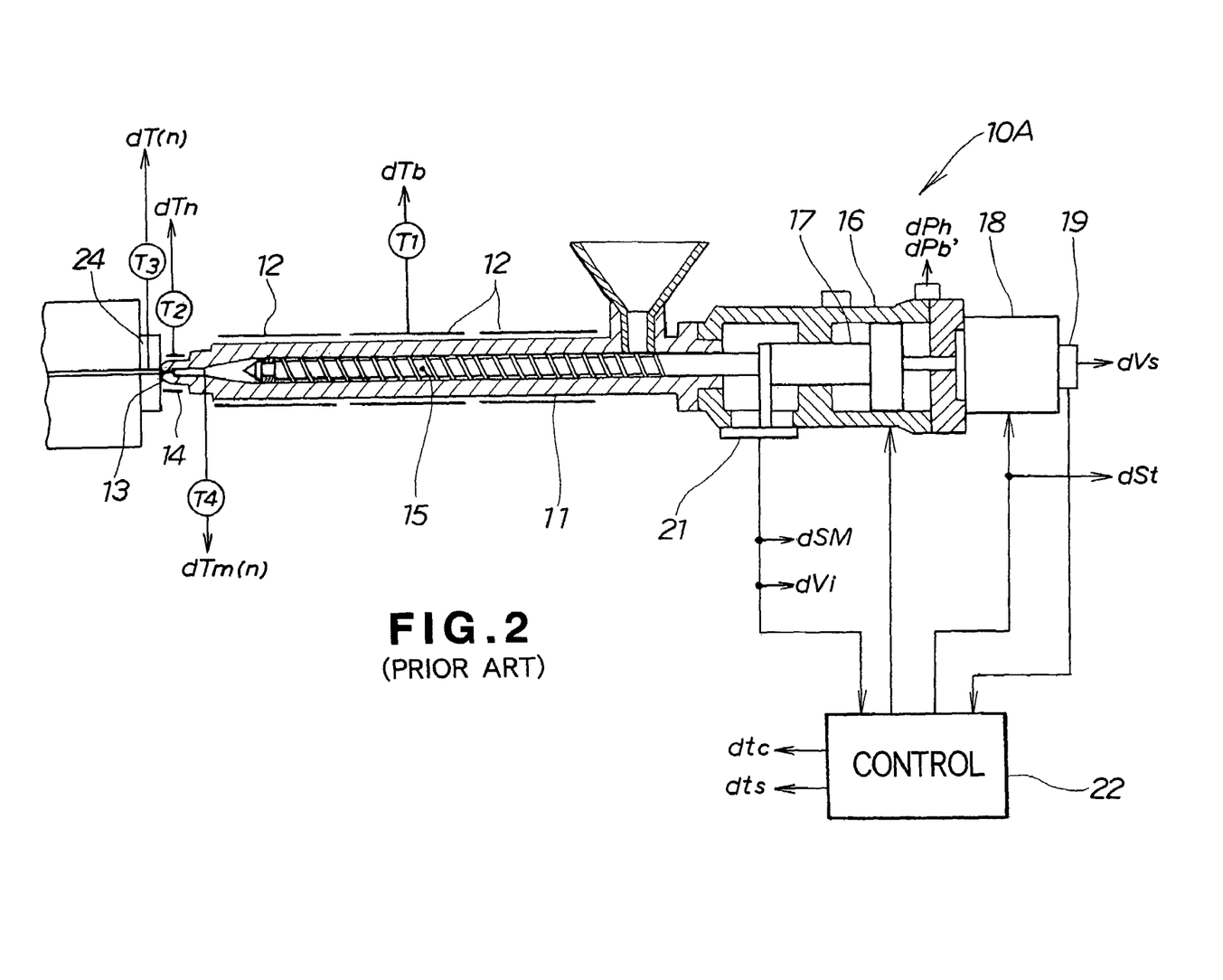
FIG. 2 is a sectional view showing various components, various temperature measurement sections in particular, of a conventionally-known injection mechanism of a data acquiring type.

Initial reference is made to FIG. 2 showing in section a conventional injection mechanism of a data acquiring type which is provided with sensors for acquiring various data. The conventional injection mechanism 10A includes a heating cylinder 11, a nozzle 13 provided at the distal end of the heating cylinder 11, and band heaters 12 and 14 disposed around the heating cylinder 11 and nozzle 13, respectively. The injection mechanism 10A further includes a screw 15 provided within the heating cylinder 11, an injection cylinder 16 for axially reciprocating the screw 15 back and forth within the heating cylinder 11, and a rotation section 18 for rotating the screw 15 via a piston rod 17 of the injection cylinder 16. Further, the injection mechanism 10A includes a number-of-rotation sensor 19 for measuring the number of rotations of the screw 15, a stroke sensor 21 for detecting an axial stroke or position of the screw 15, and a control section 22 for controlling the injection cylinder 16 and rotation section 18 on the basis of any of detection signals output from the number-of-rotation sensor 19 and stroke sensor 21.

In addition to the above-mentioned fundamental components, the injection mechanism 10A includes a first temperature measurement section T1 provided near any one of the band heaters 12, which generates heating temperature data Tb. The function of the first temperature measurement section T1 may be performed by a temperature sensor permanently provided on the beating cylinder 11, in which case the first temperature measurement section T1 can be dispensed with.

Second temperature measurement section T2 is provided near any one of the nozzle band heaters 14 and generates nozzle temperature data dTn. Third temperature measurement section T3 is provided on or near a sprue bushing 24 of an injection mold and generates data dT(n) indicative of a temperature of resin at the outlet of the nozzle 13 (hereinafter also called "nozzle-outlet resin temperature data dT(n)"). Fourth temperature measurement section T4 is provided at or near the distal end of the heating cylinder 11 and generates data dTm(n) indicative of a temperature of plasticized resin (hereinafter also called "plasticized resin temperature data dTm(n)").

Other data are generated by the above-mentioned various components, as set forth below.

Resin metering torque data dSt is generated by the rotation section 18, number-of-rotation data dVs is generated by the number-of-rotation sensor 19, metered resin amount data dSM and filling speed data dVi are generated by the stroke sensor 21. The above-mentioned data are input to, or acquired by, the control section 22, which generates cycle time data dtc and resin metering time data dts.

Table 1 below lists the various data acquired and generated by the control section 22, where "d" in various reference characters is a common suffix to the various data.

TABLE 1

| Reference Character | Name of Data | Time of Data Generation/Acquisition |
| --- | --- | --- |
| dTb | Heating Cylinder Temperature Data | Metering Step |
| Dtc | Cycle Time Data | All Steps |
| dSM | Metered Resin Amount Data | Metering Step |
| dPb | Back Pressure Data | Metering Step |
| dVs | Number-of-screw-rotation Data | Metering Step |
| Dts | Resin Metering Time Data | Metering Step |
| dSt | Resin Metering Torque Data | Metering Step |
| dTm(n) | Plasticized Resin Temperature Data | Metering Step |
| dVi | Filling Speed Data | Injecting Step |
| dPh | Holding Pressure Data | Injecting Step |
| dTn | Nozzle Temperature Data | Injecting Step |
| dT(n) | Nozzle-outlet Resin Temperature Data | Injecting Step |

Figure 1:
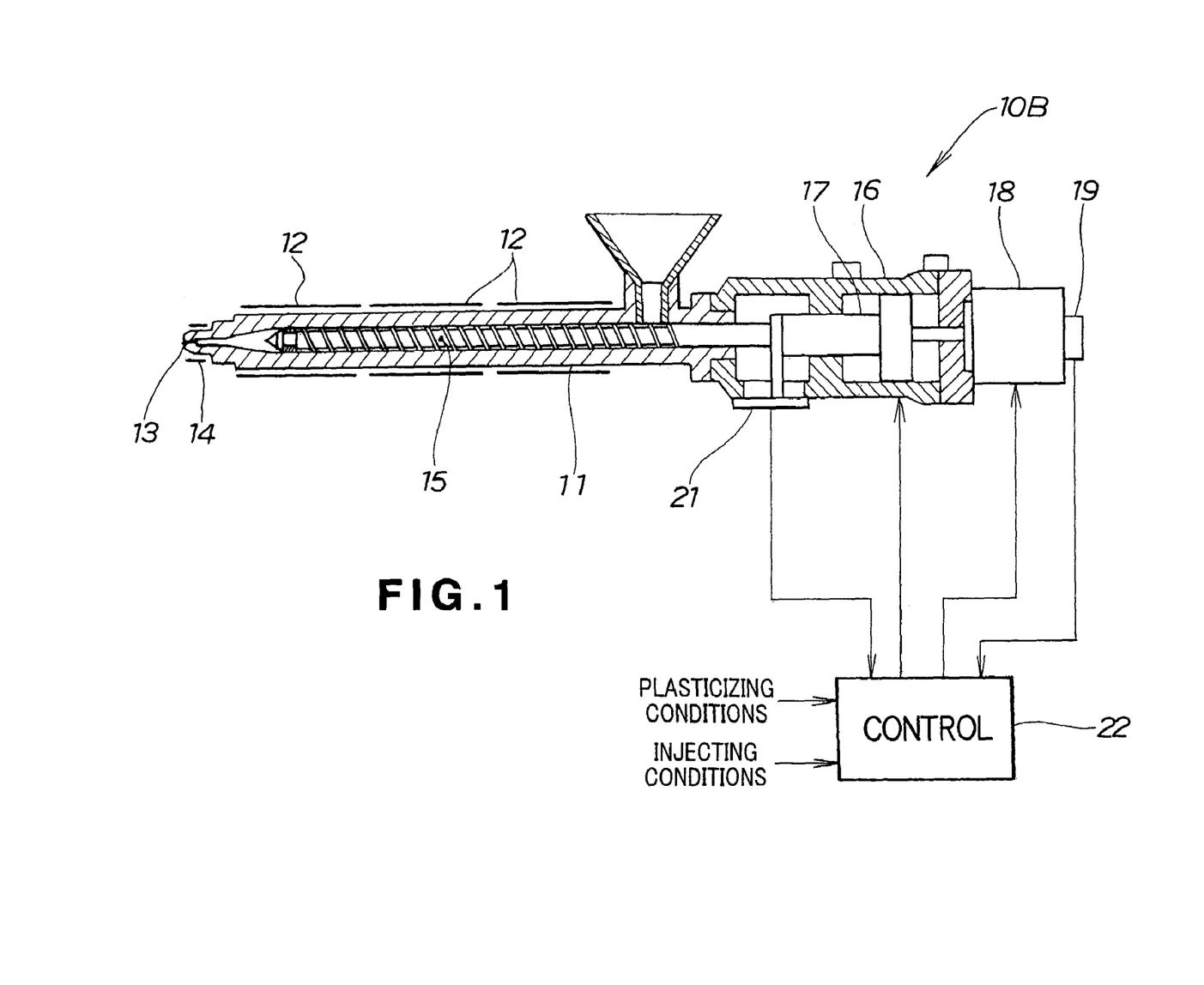
FIG. 1 is a sectional view showing an injection mechanism to which are applied the basic principles of the present invention.

Reference is made now to FIG. 1 showing in section a novel or improved injection mechanism to which are applied the basic principles of the present invention (i.e., injection mechanism 10B of the present invention). Similarly to the conventional injection mechanism 10A shown in FIG. 2, the injection mechanism 10B of FIG. 1 includes a heating cylinder 11, a nozzle 13 provided at the distal end of the heating cylinder 11, and band heaters 12 and 14 disposed around the heating cylinder 11 and nozzle 13, respectively.

The injection mechanism 10B further includes a screw 15 provided within the heating cylinder 11, an injection cylinder 16 for axially reciprocating the screw 15 back and forth within the heating cylinder 11, and a rotation section 18 for rotating the screw 15 via a piston rod 17 of the injection cylinder 16. Further, the injection mechanism 10B includes a number-of-rotation sensor 19 for measuring the number of rotations of the screw 15, a stroke sensor 21 for detecting an axial stroke or position of the screw 15, and a control section 122 for controlling the injection cylinder 16 and rotation section 18.

As seen in FIG. 1, at least the temperature measurement sections T3 and T4 shown in FIG. 2 are not provided in the injection mechanism 10B of the present invention, so that the nozzle 13 of the injection mechanism 10B can be simplified in construction as compared to the previously-discussed conventional injection mechanism 10A which must be indispensably provided with the temperature measurement sections T3 and T4.

Namely, through use of novel temperature estimation methods to be described below, the injection mechanism 10B of the present invention can eliminate the need for the temperature measurement sections T3 and T4 for generating the nozzle-outlet resin temperature data dT(n) and plasticized resin temperature data dTm(n).

Figure 3:
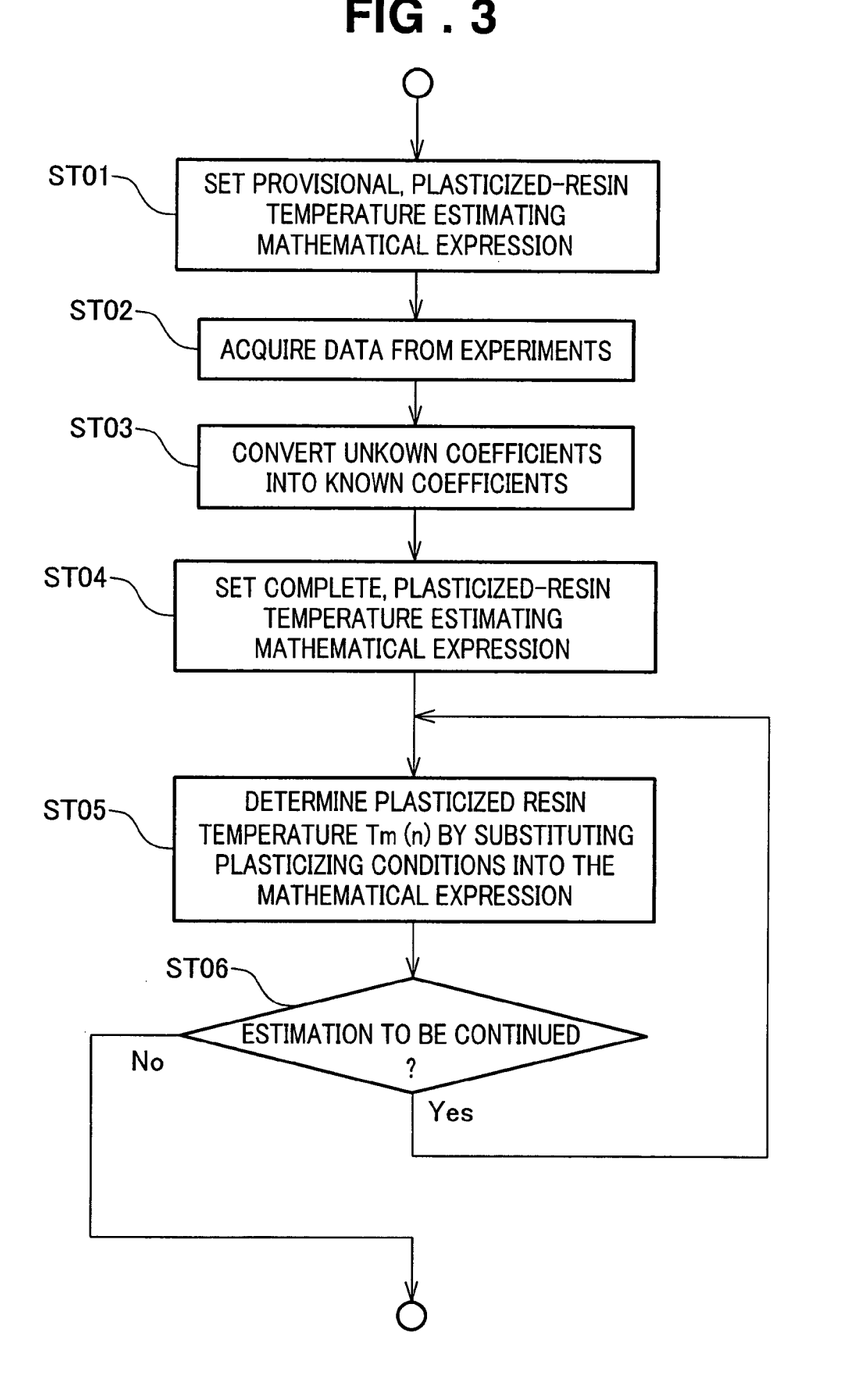
FIG. 3 is a flow chart showing a control sequence of a process for estimating a temperature of plasticized resin within a heating cylinder of the injection mechanism of FIG. 1.

Next, reference is made to the flowchart of FIG. 3, showing an example control sequence of a process, performed by the control section 122 of the injection mechanism 10B or high-order control unit connected with the injection mechanism 10B, for estimating a temperature of plasticized resin within the heating cylinder 11 in accordance with a first embodiment of the invention.

Step ST01: the following provisional (or incomplete) nozzle-outlet resin temperature estimating mathematical expression is set, which indicates that the plasticizing conditions used as terms are to be multiplied by unknown coefficients. The provisional (or incomplete) nozzle-outlet resin temperature estimating mathematical expression is so named here because the coefficients are unknown.

$$Tm(n) = a_0 + a_1 \cdot Tb + a_2 \cdot tc + a_3 \cdot SM + a_4 \cdot Pb + a_5 \cdot Vs \quad \text{(Expression 1)}$$

("$a_0$" to "$a_5$" represent the unknown coefficients)

| Signs of Term | What is Meant by the Term | Step Concerned |
| --- | --- | --- |
| Tb | Heating Cylinder Temperature | Metering Step |
| Tc | Cycle Time | All Steps |
| SM | Metered resin amount | Metering Step |
| Pb | Back Pressure | Metering Step |
| Vs | Number of Screw Rotations | Metering Step |
| Tm(n) | Plasticized Resin Temperature | Metering Step |

Step ST02: A given number of experiments equal to or greater than the number of the unknown coefficients in the mathematical expression are conducted while the plasticizing conditions are varied, so as to acquire the data listed in Table 1 above in generally the same manner as described in relation to FIG. 2.

Step ST03: A given number of simultaneous equations equal to the number of unknown coefficients (in this case, six unknown coefficients) are set, and these simultaneous equations are converted into a six-dimensional equation of the first degree with unknown coefficients "$a_0$"-"$a_5$" by substituting "dTb" for "Tb" of the second term and "dtc" for "tc" of the third term. Then, by solving the six-dimensional equation of the first degree, the unknown coefficients "$a_0$"-"$a_5$" are converted into numerical values, i.e. known coefficients "$A_0$"-"$A_5$". The conversion of the unknown coefficients "$a_0$"-"$a_5$" into the known coefficients "$A_0$"-"$A_5$" may also be performed using the multi-regression analysis, or any other suitable schemes.

Step ST04: The conversion of the unknown coefficients "$a_0$"-"$a_5$" into the known coefficients "$A_0$"-"$A_5$" can provide the following complete plasticized-resin temperature estimating mathematical expression:

$$Tm(n)=A_0+A_1 \cdot Tb+A_2 \cdot tc+A_3 \cdot SM+A_4 \cdot Pb+A_5 \cdot Vs \quad \text{(Expression 2)}$$

("$A_0$" to "$A_5$" represent the known coefficients)

Step ST05: The plasticized resin temperature Tm(n) is determined by substituting artificially-set plasticizing conditions Tb, tc, SM, Pb and Vs into the above-mentioned complete plasticized-resin temperature estimating mathematical expression.

Step ST06: If it is necessary to determine the plasticized resin temperature Tm(n) with the plasticizing conditions Tb, tc, SM, Pb and Vs modified, then the control reverts to step ST05.

In case the above-mentioned temperature estimating mathematical expression is inapplicable due to replacement of the screw or change of materials used, the control reverts to the beginning of the control flow.

Note that the temperature estimating mathematical expression to be set at step ST01 may be other than the above-mentioned, such as $$Tm(n)=A_0+A_1 \cdot Tb, \text{ or}$$

$$Tm(n)=A_0+A_1 \cdot SM+A_2 \cdot Pb+A_3 \cdot Vs$$

Namely, in the present invention, it is possible to select one or more (including all) of the heating cylinder temperature Tb, cycle time tc, metered resin amount SM, back pressure Pb and number of screw rotations Vs.

Namely, according to the first embodiment of the present invention, the process for estimating a temperature of plasticized resin in the heating cylinder 11 is characterized by including: a step of selecting one or more (including all) of a heating cylinder temperature Tb, cycle time tc, metered resin amount SM, back pressure Pb and number of screw rotations Vs to be set as plasticizing conditions, and setting a provisional or incomplete plasticized-resin temperature estimating mathematical expression indicating that the selected plasticizing conditions are to be multiplied by respective unknown coefficient "$a_0$"-"$a_5$" and the multiplication results are to be summed up; a step of conducting a given number of experiments equal to or greater than the number of the unknown coefficients in the provisional plasticized-resin temperature estimating mathematical expression, to thereby acquire data indicative of the one or more (including all) of the heating cylinder temperature Tb, cycle time tc, metered resin amount SM, back pressure Pb and number of screw rotations Vs; a step of converting the unknown coefficients "$a_0$" to "$a_5$" into known coefficients "$A_0$" to "$A_5$"; a step of converting the provisional plasticized-resin temperature estimating mathematical expression into a complete plasticized-resin temperature estimating mathematical expression using the known coefficients "$A_0$" to "$A_5$", and a step of estimating a current plasticized resin temperature Tm(n) by inserting or substituting plasticizing conditions (one or more of the heating cylinder temperature Tb, cycle time tc, metered resin amount SM, back pressure Pb and number of screw rotations Vs) into the complete plasticized-resin temperature estimating mathematical expression.

In normal operations after experiments or trial operations, the first embodiment of the invention can arithmetically estimate the current temperature of the plasticized resin in the heating cylinder 11, using the mathematical expressions, without actual measuring operations. As a consequence, the nozzle 13 need not be provided with any physical temperature measuring means, and thus a simplified construction of the nozzle 13 can be achieved. Further, whereas the conventionally-known technique estimates such a plasticized resin temperature using a temperature of the heating cylinder and thus can only achieve a poor measurement accuracy, the first embodiment of the invention can estimate a highly-accurate plasticized resin temperature closely approximate to an actual measurement.

Furthermore, in the first embodiment of the invention, the plasticizing conditions do not include monitored values of a resin metering time and resin metering torque. Generally, in the plasticizing stage, necessary resin metering torque to be applied to the screw would decrease as the resin becomes softer than expected, but increase as the resin becomes harder than the expected. Therefore, it may be even more useful to add a monitored value of resin metering torque and/or monitored value of a resin metering time to the above-mentioned temperature estimating mathematical expression.

For the reason set forth above, a second embodiment of the present invention to be described below is characterized primarily by including monitored values of a resin metering torque and resin metering time in the plasticizing conditions.

In the second embodiment of the invention, a provisional plasticized-resin temperature estimating mathematical expression is set as follows:

$$Tm(n)=a_0+a_1 \cdot Tb+a_2 \cdot tc+a_3 \cdot SM+a_4 \cdot Pb+a_5 \cdot Vs+a_6 \cdot \Sigma ts(n-m-n)+a_7 \cdot \Sigma St(n-m-n) \quad \text{(Expression 3)}$$

("$a_0$" to "$a_7$" represent unknown coefficients)

| Sign of Term | What is Meant by the Term | Step Concerned |
|---|---|---|
| Tb | Heating Cylinder Temperature | Metering Step |
| Tc | Cycle Time | All Steps |
| SM | Metered resin amount | Metering Step |
| Pb | Back Pressure | Metering Step |
| Vs | Number of Screw Rotations | Metering Step |
| Ts | Monitored Value of Resin Metering time | Metering Step |
| St | Monitored Value of Resin Metering torque | Metering Step |
| Tm(n) | Plasticized Resin Temperature | Metering Step |

What are meant by "$\Sigma ts(n-m-n)$" and "$\Sigma St(n-m-n)$" of the seventh and eighth terms in the provisional plasticized-resin temperature estimating mathematical expression are as follows. Generally, in the conventionally-known injection mechanism, a predetermined amount of resin, corresponding to a plurality of expected moldings (molded workpieces), are temporarily accumulated in the metering zone within the heating cylinder by retracting the screw to the neighborhood of a predetermined rearward movement limit, and then the screw is moved forward while repeating a set of an injecting forward movement and intervening pause a plurality of times. In this way, a plurality of moldings can be produced during the screw's forward travel to a predetermined forward movement limit. Thus, the second embodiment of the invention is arranged to integrate the fragments of the resin metering time and resin metering torque resulting from the repetition of the injecting forward movement and pause of the screw 15. This is why "Σts(n−m-n)" and "ΣSt(n−m-n)" are assigned to the seventh and eighth terms of the plasticized-resin temperature estimating mathematical expression.

Note that the monitored values of the resin metering time and resin metering torque ts and St are similar in substance to the resin metering time data dts and resin metering torque data dSt, but different from these data dts and dSt in terms of their acquisition timing. This is the reason why the monitored values of the resin metering time and resin metering torque ts and St are different in name from the resin metering time data dts and resin metering torque data dSt.

Further, in the second embodiment of the invention, a complete plasticized-resin temperature estimating mathematical expression is set as follows:

$$Tm(n)=A_0+A_1\cdot Tb+A_2\cdot tc+A_3\cdot SM+A_4\cdot Pb+A_5\cdot Vs+A_6\cdot\Sigma ts(n-m-n)+A_7\cdot\Sigma St(n-m-n) \quad \text{(Expression 4)}$$

("$A_0$" to "$A_7$" represent known coefficients)

Process for estimating a plasticized resin temperature in accordance with the second embodiment of the invention can be performed by the control process 122 or higher-order control unit on the basis of generally the same control sequence as shown in FIG. 3.

According to the second embodiment of the present invention, the process for estimating a temperature of plasticized resin in the heating cylinder 11 is characterized by including: a step of selecting one or more (including all) of a heating cylinder temperature Tb, cycle time tc, metered resin amount SM, back pressure Pb and number of screw rotations Vs to be set as plasticizing conditions and selecting both or either one of monitored values of a resin metering time ts and resin metering torque St, and setting a provisional or incomplete plasticized-resin temperature estimating mathematical expression indicating that the selected plasticizing conditions are to be multiplied by respective unknown coefficients "$a_0$" to "$a_7$" and the multiplication results are to be summed up; a step of conducting a given number of experiments equal to or greater than the number of the unknown coefficients in the provisional plasticized-resin temperature estimating mathematical expression, to thereby acquire data indicative of the one or more of the heating cylinder temperature Tb, cycle time tc, metered resin amount SM, back pressure Pb and number of screw rotations Vs and both or either one of the monitored values of the resin metering time ts and resin metering torque St; a step of converting the unknown coefficients "$a_0$" to "$a_7$" into known coefficients "$A_0$" to "$A_7$"; a step of converting the provisional plasticized-resin temperature estimating mathematical expression into a complete plasticized-resin temperature estimating mathematical expression using the known coefficients "$A_0$" to "$A_7$", and a step of estimating a current plasticized resin temperature Tm(n) by substituting plasticizing conditions (one or more of the heating cylinder temperature Tb, cycle time tc, metered resin amount SM, back pressure Pb and number of screw rotations Vs) into the complete plasticized-resin temperature estimating mathematical expression.

In short, the second embodiment of the present invention is characterized by considering both or either one of the monitored values of the resin metering time ts and resin metering torque St in addition to the plasticizing conditions. With such an arrangement, the second embodiment of the invention can estimate, with even higher accuracy, a plasticized resin temperature which is closely approximate to an actual measurement.

Note that the "plasticized resin temperature Tm(n)" estimated by the first and second embodiments of the present invention represents a temperature of resin present at a fore end portion of the metering zone that corresponds to the position of the fourth temperature measurement section T4 of FIG. 2. It should be practical and useful to estimate a temperature of plasticized resin at the outlet of the nozzle 13 (nozzle-outlet resin temperature) with possible slight variation in the plasticized resin temperature Tm(n) taken into consideration, because the third temperature measurement section T3 of FIG. 2 can be dispensed with and therefore the costs for acquiring the data can be reduced.

In practice, however, the nozzle-outlet resin temperature is more important than the plasticized resin temperature, and thus it is desired that the nozzle-outlet resin temperature be estimated with a higher accuracy.

For that reason, there is also provided a third embodiment of the present invention, which is directed to estimating a nozzle-outlet resin temperature on the basis of the plasticized resin temperature.

Figure 4:
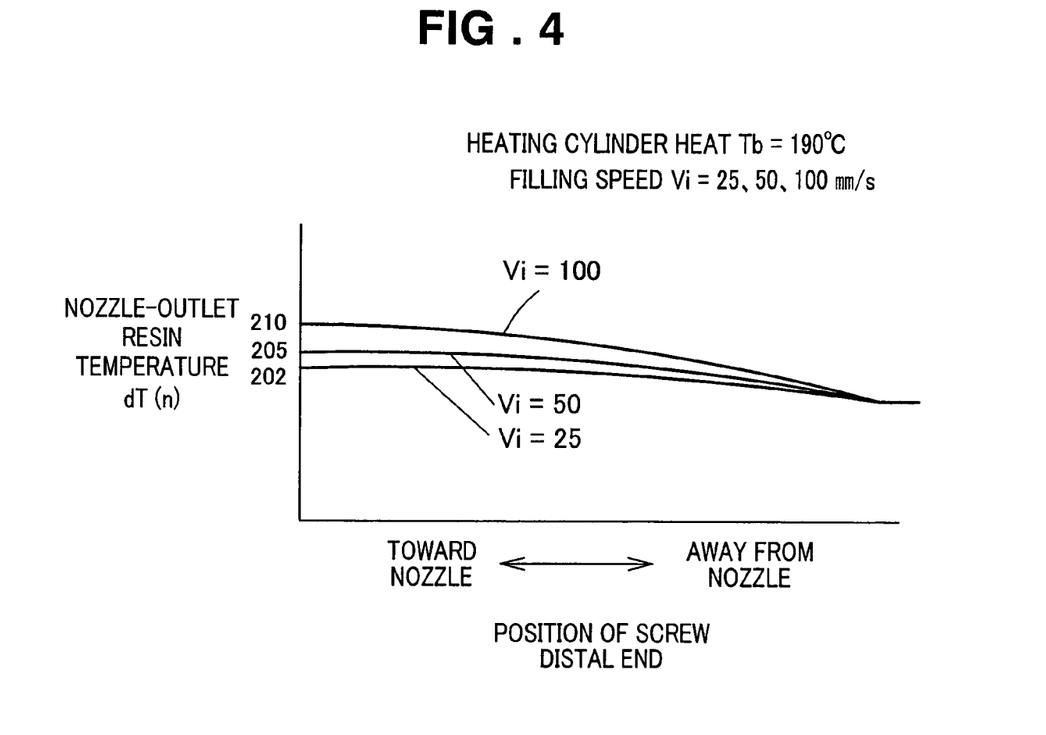
FIG. 4 is a graph showing relationships between a resin filling speed and a nozzle-outlet resin temperature in the injection mechanism of FIG. 1.

FIG. 4 is a graph showing relationships between the filling speed and the nozzle-outlet resin temperature, which were provided by measuring the nozzle-outlet resin temperature dT(n) with the heating cylinder temperature Tb set to 190° C. and the filling speed Vi set to 25 mm/s, 50 mm/s and 100 mm/s. The measurement indicates that the nozzle-outlet resin temperature dT(n) has a tendency to increase as the distal end of the screw 15 approaches closer to the nozzle 13. The nozzle-outlet resin temperature dT(n) shows a maximum, of 202° C. when the filling speed is 25 mm/s, a maximum of 205° C. when the filling speed is 50 mm/s, and a maximum of 210° C. when the filling speed is 100 mm/s. From these results, it can be seen that the filling speed has a great influence on the nozzle-outlet resin temperature.

Further, it is conceivable that the nozzle temperature and holding pressure also influence the nozzle-outlet resin temperature.

Therefore, in the third embodiment of the invention, a provisional or incomplete nozzle-outlet resin temperature estimating mathematical expression is set as follows:

$$T(n)=b_0+b_1\cdot Tm(n)+b_2\cdot Vi+b_3\cdot Ph+b_4\cdot Tn \quad \text{(Expression 5)}$$

("$b_0$" to "$b_4$" represent unknown coefficients)

| Sign of Term | What is Meant by the Term | Step Concerned |
|---|---|---|
| Tm(n) | Plasticized Resin Temperature | Metering Step |
| Vi | Filling Speed | Injecting Steps |
| Ph | Holding Pressure | Injecting Step |
| Tn | Nozzle Temperature | Injecting Step |

-continued

| Sign of Term | What is Meant by the Term | Step Concerned |
|---|---|---|
| T(n) | Nozzle-outlet Resin Temperature | Injecting Step |

Further, in the third embodiment, a complete nozzle-outlet resin temperature estimating mathematical expression is set as follows:

$$T(n) = B_0 + B_1 \cdot Tm(n) + B_2 \cdot Vi + B_3 \cdot Ph + B_4 \cdot Tn \quad \text{(Expression 6)}$$

("$B_0$" to "$B_4$" represent known coefficients)

By substituting selected injecting conditions into the nozzle-outlet resin temperature estimating mathematical expression, it is possible to estimate a current nozzle-outlet resin temperature dT(n) with high accuracy.

Figure 5:
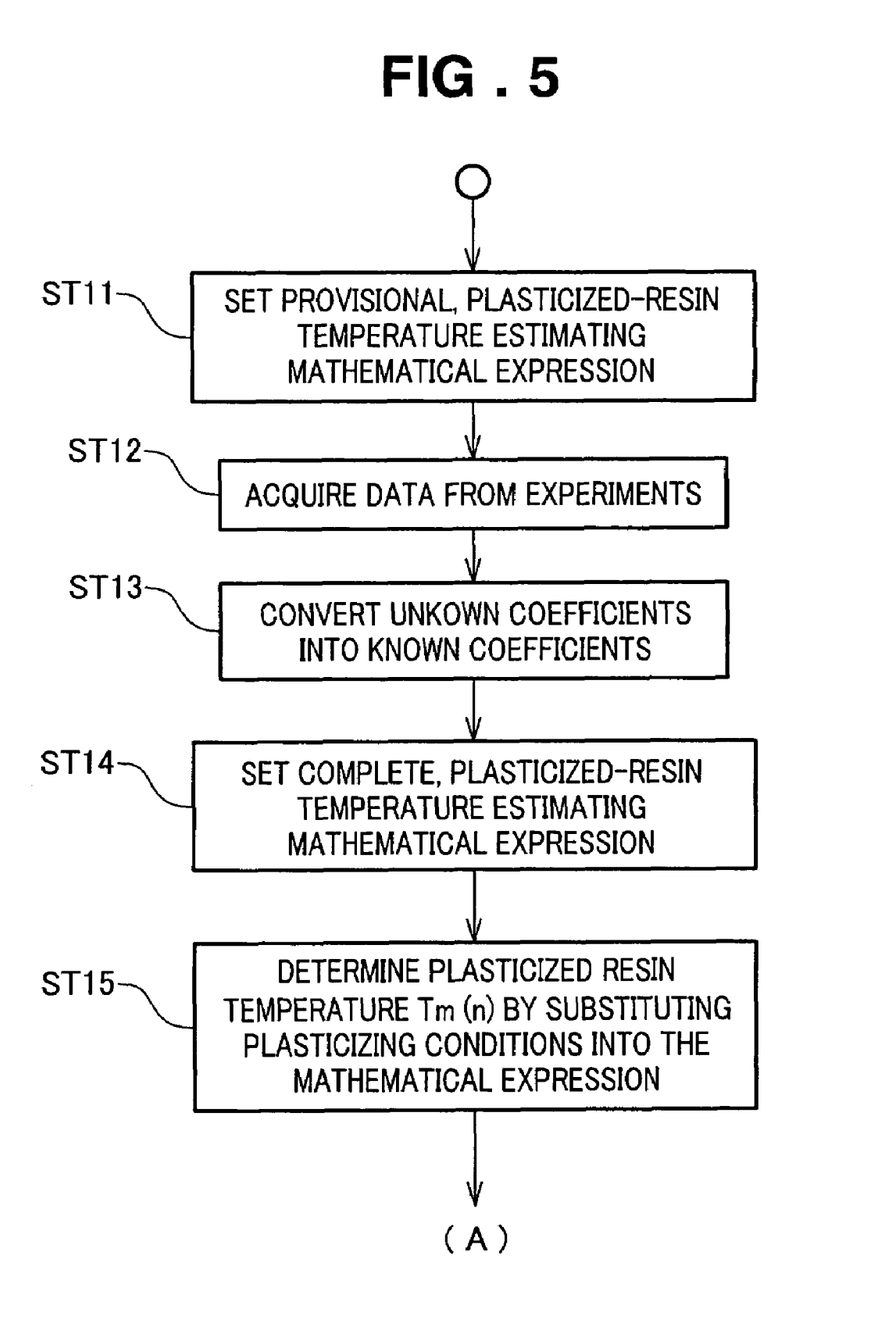
FIGS. 5 and 6 are flow charts showing a control sequence of a process for estimating a nozzle-outlet resin temperature in the injection mechanism.
Figure 6:
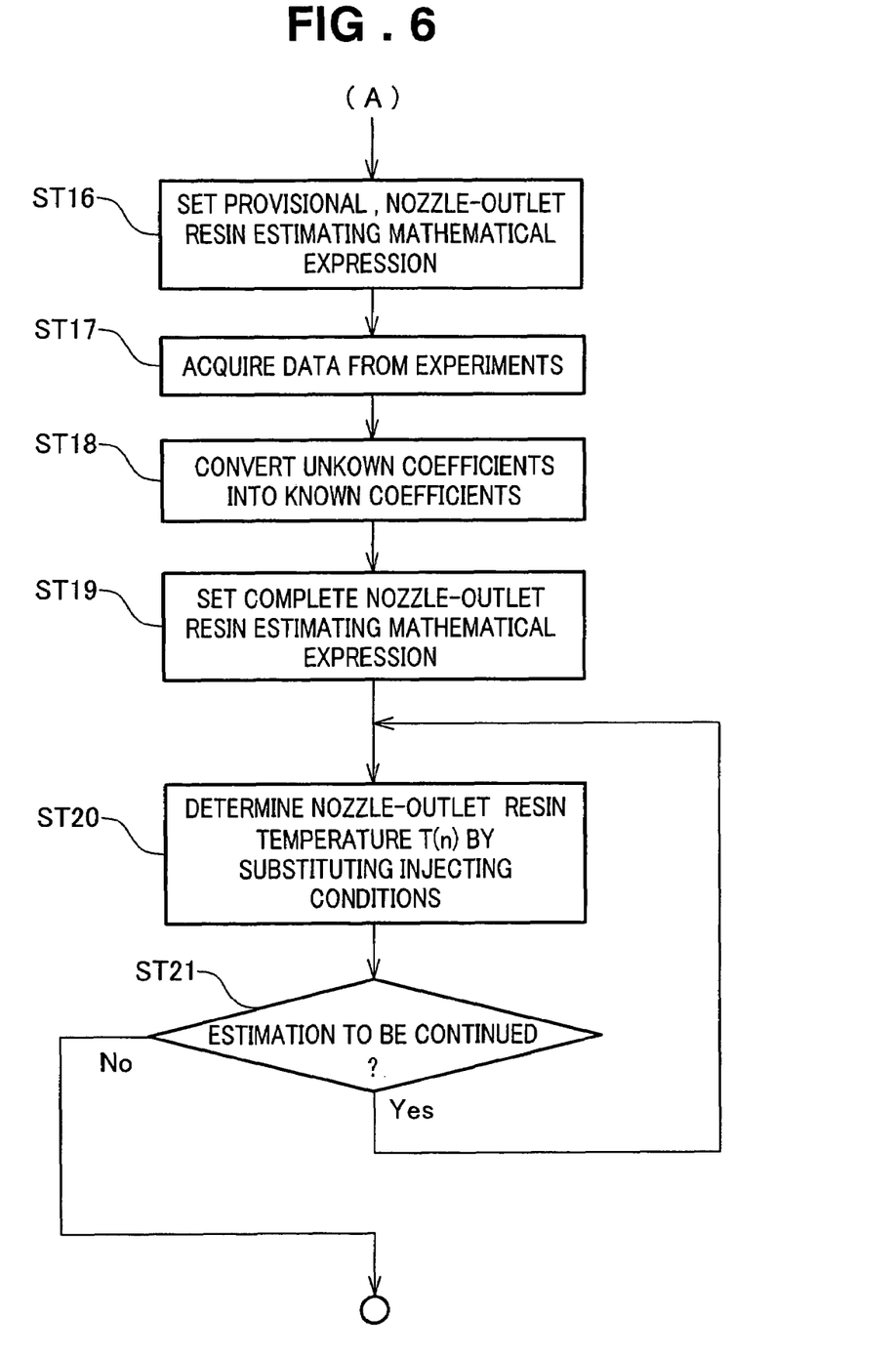

FIGS. 5 and 6 are flow charts showing an example control sequence of a process, performed by the control section 122 of the injection mechanism 10B or high-order control unit connected with the injection mechanism 10B, for estimating a nozzle-outlet resin temperature in accordance with a fourth embodiment of the present invention. FIG. 5 is generally similar to FIG. 3 except for step numbers.

Step ST11: the following provisional temperature estimating mathematical expression is set, which indicates that plasticizing conditio terms are to be multiplied by unknown coefficients and the multiplied results are to be summed up.

$$Tm(n) = a_0 + a_1 \cdot Tb + a_2 \cdot tc + a_3 \cdot SM + a_4 \cdot Pb + a_5 \cdot Vs \quad \text{(Expression 7)}$$

("$a_0$" to "$a_5$" represent the unknown coefficients)

| Sign of Term | What is Meant by the Term | Step Concerned |
|---|---|---|
| Tb | Heating Cylinder Temperature | Metering Step |
| Tc | Cycle Time | All Steps |
| SM | Metered resin amount | Metering Step |
| Pb | Back Pressure | Metering Step |
| Vs | Number of Screw Rotations | Metering Step |
| Tm(n) | Plasticized Resin Temperature | Metering Step |

Step ST12: A given number of experiments equal to or greater than the number of the unknown coefficients in the mathematical expression are conducted while the plasticizing conditions are varied, so as to acquire the data listed in Table 1 above in generally the same manner as described in relation to FIG. 2.

Step ST13: A given number of simultaneous equations equal to the number of unknown coefficients (in this case, six unknown coefficients) are set, and these simultaneous equations are converted into a six-dimensional equation of the first degree with unknown coefficients "$a_0$"-"$a_5$" by substituting "dTb" for "Tb" of the second term with and "dtc" for "Tc" of the third term. By solving the six-dimensional equation of the first degree, the unknown coefficients "$a_0$"-"$a_5$" are converted into numerical values, i.e. known coefficients "$A_0$"-"$A_5$".

Step ST14: The conversion of the unknown coefficients "$a_0$"-"$a_5$" into the known coefficients "$A_0$"-"$A_5$" can provide the following complete plasticized-resin temperature estimating mathematical expression:

$$Tm(n) = A_0 + A_1 \cdot Tb + A_2 \cdot tc + A_3 \cdot SM + A_4 \cdot Pb + A_5 \cdot Vs \quad \text{(Expression 8)}$$

("$A_0$" to "$A_5$" represent the known coefficients)

Step ST15: The plasticized resin temperature Tm(n) is determined by inserting or substituting artificially-set plasticizing conditions Tb, tc, SM, Pb and Vs into the above-mentioned complete plasticized-resin temperature estimating mathematical expression.

Step ST16 and subsequent steps will be described with reference to FIG. 6.

Step ST16: the following provisional nozzle-outlet resin temperature estimating mathematical expression is set, which indicates that injecting conditions used as terms are to be multiplied by unknown coefficients and the multiplied results are to be summed up:

$$T(n) = b_0 + b_1 \cdot Tm(n) + b_2 \cdot Vi + b_3 \cdot Ph + b_4 \cdot Tn \quad \text{(Expression 9)}$$

("$b_0$" to "$b_4$" represent unknown coefficients)

| Sign of Term | What is Meant by the Term | Step Concerned |
|---|---|---|
| Tm(n) | Plasticized Resin Temperature | Metering Step |
| Vi | Filling Speed | Injecting Steps |
| Ph | Holding Pressure | Injecting Step |
| Tn | Nozzle Temperature | Injecting Step |
| T(n) | Nozzle-outlet Resin Temperature | Injecting Step |

Step ST17: A given number of experiments equal to or greater than the number of the unknown coefficients in the mathematical expression are conducted while the injecting conditions are varied, so as to acquire the data listed in Table 1 above in generally the same manner as described in relation to FIG. 2.

Step ST18: A given number of simultaneous equations equal to the number of unknown coefficients (in this case, five unknown coefficients) are set, and these simultaneous equations are converted into a five-dimensional equation of the first degree with unknown coefficients "$b_0$"-"$b_4$" by substituting "dVi" for "Vi" of the third term with and "dPh" for "Ph" of the fourth term. By solving the five-dimensional equation of the first degree, the unknown coefficients "$b_0$"-"$b_4$" are converted into numerical values, i.e. known coefficients "$B_0$"-"$B_4$". The conversion of the unknown coefficients "$b_0$"-"$b_4$" into the known coefficients "$B_0$"-"$B_4$" may also be performed using the multiregression analysis, or any other suitable schemes.

Step ST19: The conversion of the unknown coefficients "$b_0$"-"$b_4$" into the known coefficients "$B_0$"-"$B_4$" can provide the following complete nozzle-outlet resin temperature estimating mathematical expression:

$$T(n) = B_0 + B_1 \cdot Tm(n) + B_2 \cdot Vi + B_3 \cdot Ph + B_4 \cdot Tn \quad \text{(Expression 10)}$$

("$B_0$" to "$B_4$" represent the known coefficients)

Step ST20: The nozzle-outlet resin temperature T(n) is determined by substituting artificially-set injecting conditions Vi, Ph and Tn into the above-mentioned complete nozzle-outlet resin temperature estimating mathematical expression.

Step ST21: If it is necessary to determine the nozzle-outlet resin T(n) with the injecting conditions Vi, Ph and Tn modified, then the control reverts to step ST20.

In case the above-mentioned temperature estimating mathematical expression is inapplicable due to replacement of the screw or change of the materials used, the control reverts to the beginning of the control sequence.

Namely, the third embodiment of the present invention is characterrized by including: a step of selecting one or more (including all) of a filling speed, holding pressure and nozzle temperature to be set as injecting conditions, selecting a temperature of plasticized resin within the heating cylinder 11 estimated by the above-described first or second embodiment and setting an provisional nozzle-outlet resin temperature estimating mathematical expression indicating that the selected injecting conditions and temperature are to be multiplied by respective unknown coefficients and the multiplication results are to be summed up; a step of conducting a given number of experiments equal to or greater than the number of the unknown coefficients in the provisional nozzle-outlet resin temperature estimating mathematical expression, to thereby acquire data indicative of the one or more of the temperature and filling speed of plasticized resin at the distal end of the heating cylinder 11, holding pressure and nozzle temperature; a step of converting the unknown coefficients into known coefficients in accordance with the acquired data; a step of converting the provisional nozzle-outlet resin temperature estimating mathematical expression into a complete nozzle-outlet resin temperature estimating mathematical expression using the known coefficients; and a step of estimating a current nozzle-outlet resin by substituting injecting conditions into the complete nozzle-outlet resin temperature estimating mathematical expression.

Whereas the first and second embodiments of the invention are directed to estimating a temperature of plasticized resin within the heating cylinder 11, the third embodiment is directed to estimating a resin temperature at the outlet of the nozzle 13. Because the nozzle-outlet resin temperature is one of the most significant parameters in controlling the resin molding, the third embodiment can be said to be even more useful than the first and second embodiments.

Fourth embodiment of the present invention to be described below is arranged more or less as a modification of the above-described third embodiment. According to the fourth embodiment, the nozzle-outlet resin temperature estimating mathematical expression employed in the third embodiment is modified to set a different mathematical expression for each of the injecting conditions Vi, Ph and Tn. For example, there can be set a filling speed (Vi) estimating mathematical expression as follows:

$$Vi = [B_0 + B_1 \cdot Tm(n) + B_3 \cdot Ph + B_4 \cdot Tn - T(n)]/B_2 \quad \text{(Expression 11)}$$

("$B_0$" to "$B_4$" represent known coefficients)

With this mathematical expression, it is possible to determine a necessary filling speed Vi by assuming a nozzle-outlet resin temperature T(n). The other injecting conditions Ph and Tn can be determined in a similar manner to the filling speed Vi.

Namely, the fourth embodiment of the present invention is characterized by including: a step of selecting one or more (including all) of a filling speed, holding pressure and nozzle temperature to be set as injecting conditions, selecting a temperature of plasticized resin within the heating cylinder 11 estimated by the above-described first or second embodiment and setting a provisional nozzle-outlet resin temperature estimating mathematical expression indicating that the selected injecting conditions and temperature are to be multiplied by respective unknown coefficients and the multiplication results are to be summed up; a step of conducting a given number of experiments equal to or greater than the number of the unknown coefficients in the provisional nozzle-outlet resin temperature estimating mathematical expression, to thereby acquire data indicative of one or more of the temperature and filling speed of plasticized resin at the distal end of the heating cylinder 11, holding pressure and nozzle temperature; a step of converting the unknown coefficients into known coefficients in accordance with the acquired data; a step of converting the provisional nozzle-outlet resin temperature estimating mathematical expression into a complete nozzle-outlet resin temperature estimating mathematical expression using the known coefficients; and a step of estimating a given one of the injecting conditions by substituting, into the complete nozzle-outlet resin temperature estimating mathematical expression, injecting conditions other than the given injecting condition, and a desired nozzle-outlet resin temperature value.

The fourth embodiment of the invention thus arranged can achieve high-accuracy estimation of any one of the filling speed, holding pressure and nozzle temperature, so that it can set injecting conditions of higher accuracy than those set by the conventionally-known technique.

Now, a description will be given about an injection molding assistance apparatus employing any of the above-described first to fourth embodiments of the invention.

Figure 7:
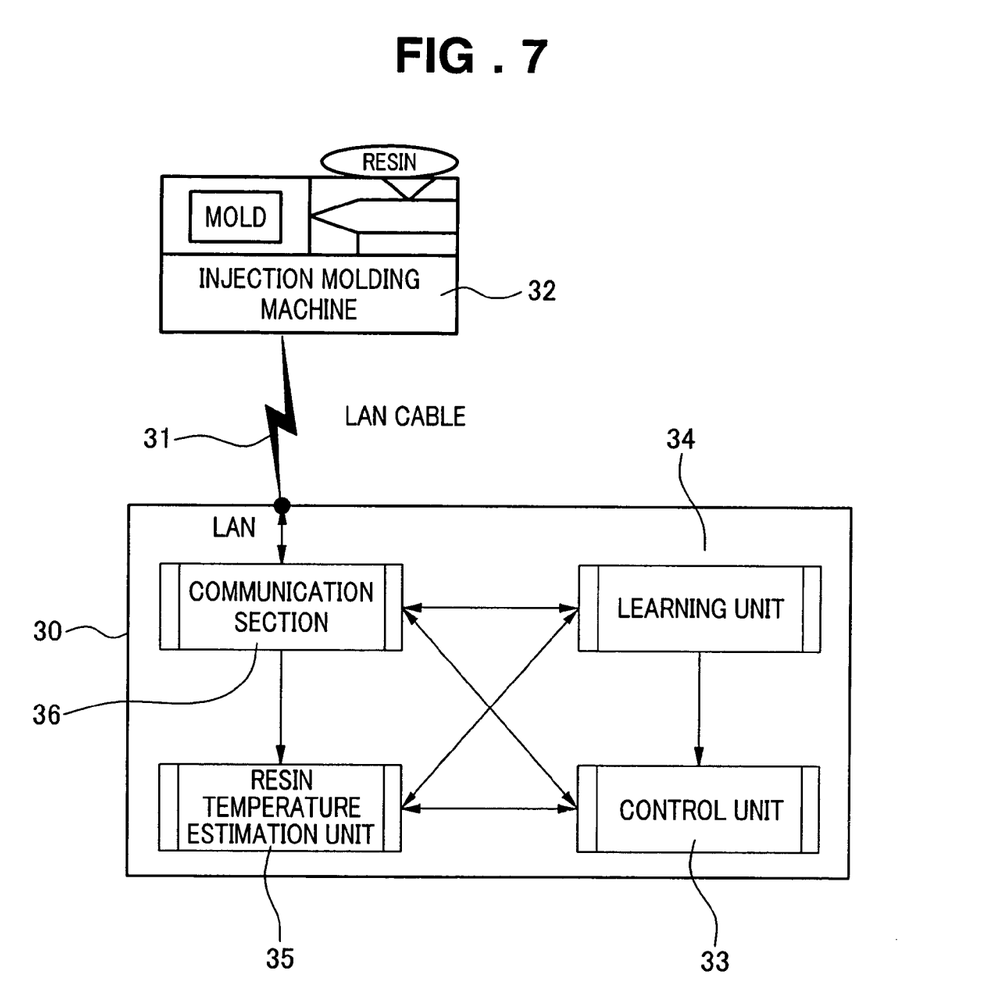
FIG. 7 is a functional block diagram outlining an injection molding assistance apparatus operating on the basic principles of the present invention.

FIG. 7 is a functional block diagram outlining the injection molding assistance apparatus 30, which is connected to an injection molding machine 32 via a LAN (wired or wireless) 31 to assist operations performed by the injection molding machine 32. The above-mentioned higher-order control unit may be implemented by the injection molding assistance apparatus 30. As shown, the injection molding assistance apparatus 30 generally comprises a control unit 33, a learning unit 34, a resin temperature estimation unit 35 for performing temperature estimating operations based on the principles of the present invention, and a communication section 36 for communicatively connected with the injection molding machine 32. The control unit 33, learning unit 34 and resin temperature estimation unit 35 each include a plurality of internal functional sections, which will be denoted by the corresponding reference numeral 33, 34 or 35 with suffixes "a" and "b".

Figure 8:
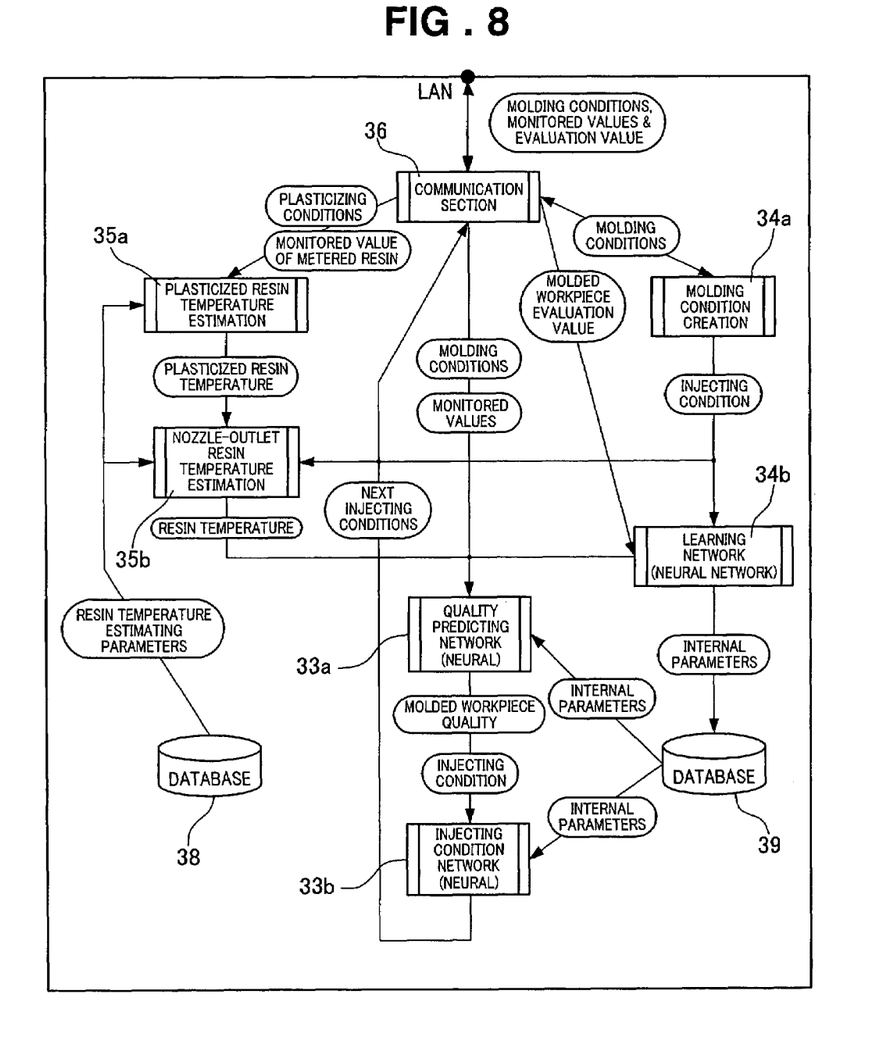
FIG. 8 is a block diagram showing a detailed construction of the injection molding assistance apparatus of FIG. 7.

FIG. 8 is a block diagram showing a detailed construction of the injection molding assistance apparatus 30. Plasticized resin temperature estimating section 35a of the estimation unit 35 generates an estimated value of a plasticized resin temperature, on the basis of data indicative of plasticizing conditions and monitored value of metered resin received via the communication section 36 and resin temperature estimating parameters received from a database 38.

Nozzle-outlet resin estimating section 35b generates an estimated value of a nozzle outlet resin temperature, on the basis of the estimated value of the plasticized resin temperature received from the section 35a, resin temperature estimating parameters received from the database 38 and injecting conditions received from a molding condition creating section 34a of the learning unit 34.

The molding condition creating section 34a generates injecting conditions, on the basis of molding conditions received from the communication section 36. Learning network section 34b generates internal parameters on the basis of the estimated value of the nozzle outlet resin temperature received from the nozzle-outlet resin estimating section 35b and molded workpiece evaluation value received from the communication section 36, and the network section 34b sends the generated internal parameters to a database 39.

Further, a quality predicting network section 33a generates molded workpiece quality information, on the basis of the molding conditions and monitored value received from the communication section 36 and internal parameters received from the database 39. Then, an injecting condition network section 33b generates next injecting conditions on the basis of the current injecting conditions and molded workpiece quality information as well as the internal parameters received from the database 39. The thus-generated next injecting conditions are delivered via the communication section 36 to the injection molding machine 32 of FIG. 7 for use in injection molding operations performed therein.

With the resin temperature estimation unit 35, and the plasticized resin temperature estimating section 35a and nozzle-outlet resin estimating section 35b in particular, the injection molding assistance apparatus 30 can achieve high-accuracy estimation of the nozzle-outlet resin temperature, and it allows the injection molding machine 32 to appropriately operate on the basis of the estimated value of the nozzle-outlet resin temperature. As a result, the injection molding assistance apparatus 30 can provide molded workpieces of higher quality with less quality variation.

In summary, the present invention having been described above can estimate the current temperature of the plasticized resin within the heating cylinder, using the mathematical expressions, without actual measuring operations. As a consequence, the nozzle need not be provided with any physical temperature measuring means, and thus a simplified construction of the nozzle can be achieved. Further, whereas the conventionally-known technique estimates such a plasticized resin temperature on the basis of a detected temperature of the heating cylinder and thus can only achieve a poor measurement accuracy, the present invention can estimate, with much higher accuracy, plasticized resin temperature closely approximate to an actual measurement.

Further, by considering both or either one of the monitored values of the resin metering time and resin metering torque in addition to the plasticizing conditions, the present invention can estimate, with even higher accuracy, the plasticized resin temperature which is closely approximate to an actual measurement.

Further, the present invention can arithmetically estimate, with higher accuracy, a nozzle-outlet resin temperature, using the mathematical expressions, without actual measuring operations.

Furthermore, the present invention can achieve high-accuracy estimation of any one of the filling speed, holding pressure and nozzle temperature, so that it can set injecting conditions of higher accuracy than those set by the conventional technique.

Obviously, various minor changes and modifications of the present invention are possible in the light of the above teaching. It is therefore to be understood that within the scope of the appended claims the invention may be practiced otherwise than as specifically described.

What is claimed is:

1. A method for estimating a temperature of plasticized resin within a heating cylinder, which comprises:
   selecting two or more of a heating cylinder temperature, cycle time, metered resin amount, hack pressure arid number of rotations of a screw to be set as plasticizing conditions, and setting a provisional plasticized-resin temperature estimating mathematical expression indicating that the selected plasticizing conditions arc to be multiplied by respective unknown coefficients and summed up;
   conducting a given number of experiments equal to or greater than the number of the unknown coefficients in the provisional plasticized-resin temperature estimating mathematical expression, to thereby acquire data indicative of the selected plasticizing conditions;
   converting the unknown coefficients into known coefficients in accordance with the data acquired from the experiments;
   converting the provisional plasticized-resin temperature estimating mathematical expression into a complete plasticized-resin temperature estimating mathematical expression using the known coefficients; and
   estimating a current temperature of the plasticized resin within the heating cylinder by substituting data for the selected plasticizing conditions into the complete plasticized-resin temperature estimating mathematical expression.

2. A method for estimating a temperature of plasticized resin within a heating cylinder, which comprises:
   selecting two or more of a heating cylinder temperature, cycle time, metered resin amount, back pressure and number of rotations of a screw to be set as plasticizing conditions, selecting at least one monitored value of a resin metering time and resin metering torque, and setting a provisional plasticized-resin temperature estimating mathematical expression indicating that the selected plasticizing conditions and the at least One selected monitored value are to be multiplied by respective unknown coefficients and summed up;
   conducting a given number of experiments equal to or greater than the number of the unknown coefficients in the provisional plasticized-resin temperature estimating mathematical expression, to thereby acquire data indicative of the selected plasticizing conditions the at least one selected monitored values;
   converting the unknown coefficients into known coefficients in accordance with the data acquired from the experiments;
   converting the provisional plasticized-resin temperature estimating mathematical expression into a complete plasticized-resin temperature estimating mathematical expression using the known coefficients; and
   estimating a current temperature of the plasticized resin by substituting data for the selected plasticizing conditions and data for the at least one monitored value into the complete plasticized-resin temperature estimating mathematical expression.

3. A method for estimating a temperature of resin at an outlet of a nozzle, which comprises:
   selecting one or more of a filling speed, holding pressure and nozzle temperature to be set as injecting conditions, selecting a temperature of plasticized resin within a heating cylinder estimated by said method as recited in claim 1, and setting a provisional nozzle-outlet resin temperature estimating mathematical expression indicating that the one or more selected injecting conditions and the selected temperature of the plasticized resin are to be multiplied by respective unknown Coefficients and summed up;
   conducting a given number of experiments equal to or greater than the number of the unknown coefficients in the provisional nozzle-outlet resin temperature estimating mathematical expression, to thereby acquire data indicative of the temperature of the plasticized resin within a distal end of the heating cylinder and the one or more selected injecting conditions;

converting the unknown coefficients into known coefficients in accordance with the data acquired from the experiments;

converting the provisional nozzle-outlet resin temperature estimating mathematical expression into a complete nozzle-outlet resin temperature estimating mathematical expression using the known coefficients; and estimating a current temperature of the resin at the outlet of the nozzle by substituting data for the one or more selected injecting conditions into die complete nozzle-outlet resin temperature estimating mathematical expression.

4. A method for estimating an injecting condition, which comprises:

selecting one or more of a filling speed, holding pressure and nozzle temperature to be set as injecting conditions, selecting a temperature of plasticized resin within a heating cylinder estimated by said method as recited in claim 1 and setting a provisional nozzle-outlet resin temperature estimating mathematical expression indicating that the one or more selected injecting conditions and the selected temperature of the plasticized resin ate to be multiplied by respective unknown coefficients and summed up;

conducting a given number of experiments equal to or greater than the number of the unknown coefficients in the provisional nozzle-outlet resin temperature estimating mathematical expression, to thereby acquire data indicative of the temperature of the plasticized resin within a distal end of the beating cylinder and the one or more selected injecting conditions converting the unknown coefficients into known coefficients in accordance with the data acquired from the experiments;

converting the provisional nozzle-outlet resin temperature estimating mathematical expression into a complete nozzle-outlet resin temperature estimating mathematical expression using the known coefficients; and estimating a given one of the injecting conditions by substituting, into the complete nozzle-outlet resin temperature estimating mathematical expression, data for each of the injecting conditions other than the given injecting condition, and substituting into the complete nozzle-outlet resin temperature estimating mathematical expression a desired nozzle-outlet resin temperature value.

5. A method for estimating a temperature of resin at an outlet of a nozzle, which comprises:

selecting one or more of a filling speed, holding pressure and nozzle temperature to be set as injecting conditions, selecting a temperature of plasticized resin within a heating cylinder estimated by said method as recited in claim 2, and setting a provisional nozzle-outlet resin temperature estimating mathematical expression indicating that the one or more selected injecting conditions and the selected temperature of the plasticized resin are to be multiplied by respective unknown coefficients and summed up;

conducting a given number of experiments equal to or greater than the number of the unknown coefficients in the provisional nozzle-outlet resin temperature estimating mathematical expression, to thereby acquire data indicative of the temperature of the plasticized resin within a distal end of the heating cylinder and the one or more selected injecting conditions;

converting the unknown coefficients into known coefficients in accordance with the data acquired from the experiments;

converting the provisional nozzle-outlet resin temperature estimating mathematical expression into a complete nozzle-outlet resin temperature estimating mathematical expression using the known coefficients; and estimating a current temperature of the resin at the outlet of the nozzle by substituting data for the one or more selected injecting conditions into the complete nozzle-outlet resin temperature estimating mathematical expression.

6. A method for estimating an injecting condition, which comprises:

selecting one or more of a filling speed, holding pressure and nozzle temperature to be set as injecting conditions, selecting a temperature of plasticized resin within a heating cylinder estimated by said method as recited in claim 2 and setting a provisional nozzle-outlet resin temperature estimating mathematical expression indicating that the one or more selected injecting conditions and the selected temperature of the plasticized resin are to be multiplied by respective unknown coefficients and summed up;

conducting a given number of experiments equal to or greater than the number of the unknown coefficients in the provisional nozzle-outlet resin temperature estimating mathematical expression, to thereby acquire data indicative of the temperature of the plasticized resin within a distal end of the heating cylinder and the one or more selected injecting conditions;

converting the unknown coefficients into known coefficients in accordance with the data acquired from the experiments;

converting the provisional nozzle-outlet resin temperature estimating mathematical expression into a complete nozzle-outlet resin temperature estimating mathematical expression using the known coefficients; and estimating a given one of the injecting conditions by substituting, into the complete nozzle-outlet resin temperature estimating mathematical expression, data for each of the injecting conditions other than the given injecting condition, and substituting into the complete nozzle-outlet resin temperature estimating mathematical expression a desired nozzle-outlet resin temperature value.

* * * * *

UNITED STATES PATENT AND TRADEMARK OFFICE
CERTIFICATE OF CORRECTION

PATENT NO. : 7,303,701 B2
APPLICATION NO. : 10/703917
DATED : December 4, 2007
INVENTOR(S) : Yamagiwa et al.

It is certified that error appears in the above-identified patent and that said Letters Patent is hereby corrected as shown below:

On title page

Page 1, item (75) Inventors: "Takayoshi Shiori" should read --Takayoshi Shioiri--.

Signed and Sealed this

Sixth Day of May, 2008

JON W. DUDAS
*Director of the United States Patent and Trademark Office*